(No Model.)
H. C. CHADWELL.
ANIMAL TRAP.
No. 275,995. Patented Apr. 17, 1883.
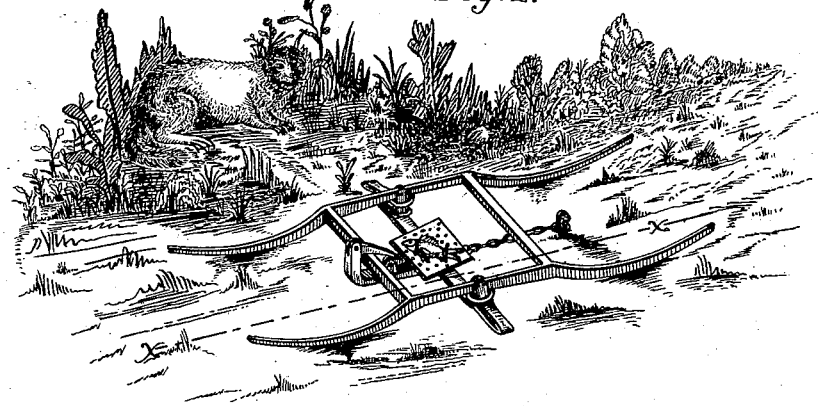
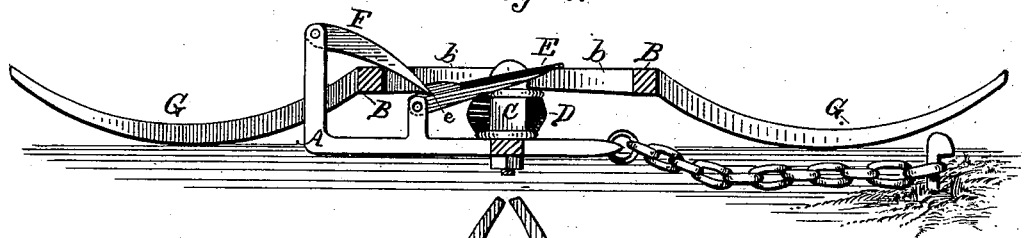
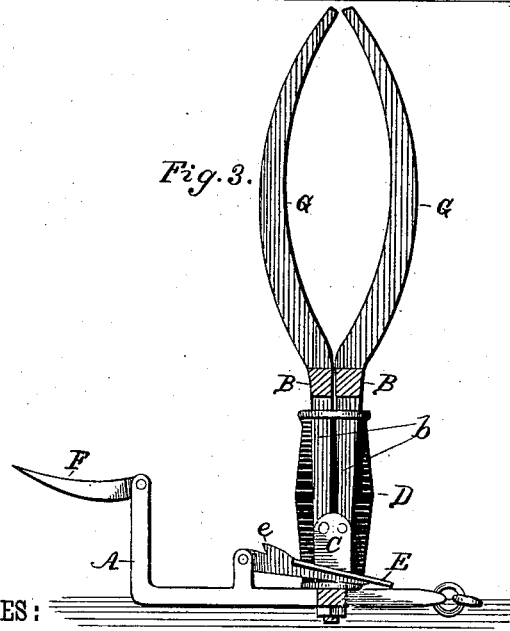
WITNESSES:
Thos. Houghton.
W. X. Stevens.
INVENTOR:
H. C. Chadwell
BY
ATTORNEYS.

UNITED STATES PATENT OFFICE.

HENRY C. CHADWELL, OF PORTSMOUTH, VIRGINIA.

ANIMAL-TRAP.

SPECIFICATION forming part of Letters Patent No. 275,995, dated April 17, 1883.

Application filed August 29, 1882. (No model.)

*To all whom it may concern:*

Be it known that I, HENRY C. CHADWELL, a citizen of the United States, residing at Portsmouth, in the county of Norfolk and State of Virginia, have invented a new and useful Improvement in Animal-Traps, of which the following is a specification.

My invention relates to animal-traps of the general class known as "steel traps," which have two pivoted jaws operated by one or more springs to close together for the purpose of catching the animal between them. Formerly these traps have been provided with jaws of a somewhat semicircular form, pivoted at the ends of the arcs and meeting each other along the plane of the arc when the trap is sprung. As the trip-pan of the trap is within the circle formed by the jaws when open, that part of the animal which presses the trip-pan and springs the trap is the part usually caught by the jaws, and that part is usually one foot of the animal.

It is a well-known fact that many animals will twist and even gnaw off the caught member to gain their liberty. To obviate this my invention is designed to catch the animal by the body as well as by the leg; and to this end it consists in the combination of parts constituting a steel trap, hereinafter fully described and set forth, reference being had to the accompanying drawings, in which—

Figure 1 is a perspective view of my invention. Fig. 2 is a vertical section at *x x*, Fig. 1, part in elevation, showing the trap set; and Fig. 3 is a similar view of the trap sprung.

A represents the body of the trap; B B, the jaws, hung, as usual, by pivot ends of the arms *b*, to posts C.

D represents the common spring encircling the arm portions *b* of the jaws B to allow the jaws to fall open when the spring is pressed down, as in Fig. 2, and to close the jaws when the spring is open, as in Fig. 3. The shank of the pan E is provided with the usual notch, *e*, in which the free end of the retainer F is caught to hold the jaws open against the force of the spring when the trap is set, as in Fig. 2. Thus far the description pertains to the common steel trap, which is made in various forms on this general principle.

G G are arms extending the arm portions *b* of the jaws B, as shown, to grasp the body of the animal. These projections G are curved outward to permit the usual jaws to close on the animal's leg as soon as said projections close on his body. By this means the animal, being held by the body, will be prevented from gnawing his caught leg off, and will be in any case doubly secure. These extended jaws or arms are also of much broader expanse than the old form of trap, and therefore more likely to catch the animal.

The advantages of this invention are so apparent, in view of this description and drawings, as to need no extended detail.

What I claim as my invention, and wish to secure by Letters Patent, is—

A steel trap having a pair of jaws shaped like two letters H, pivoted at their lower ends to meet along the cross-bar, and along the sides below the cross-bar, but curved above the cross-bar, as shown and described, for the purpose specified.

H. C. CHADWELL.

Witnesses:
   SOLON C. KEMON,
   W. X. STEVENS.